Jan. 14, 1936.  F. A. BOURGES  2,027,369

PHOTOGRAPHIC APPARATUS

Filed March 3, 1933

Inventor
Fernand A. Bourges
By Cyrus Kehr
Attorney

Patented Jan. 14, 1936

2,027,369

UNITED STATES PATENT OFFICE 2,027,369

PHOTOGRAPHIC APPARATUS

Fernand A. Bourges, New York, N. Y.

Application March 3, 1933, Serial No. 659,556

6 Claims. (Cl. 88—16.4)

This invention relates to an improvement in motion picture photographic apparatus of the type wherein a plurality of exposures are made simultaneously of the same object from the same point of view.

A plurality of reflecting transparencies, such for instance, as three, are arranged so that light passing in a straight line from the object passes through all of them. By setting these reflecting transparencies at an angle of 45 degrees to said light, they not only allow the light to pass through them but they also reflect the light at their surfaces to motion picture cameras placed adjacent the reflecting transparencies so as to be uniformly spaced from the object. All of the cameras are focused together and provision is made for simultaneous operation and exposure.

As the light passes through each of the reflecting transparencies, the interference by the transparency through which the light passes distorts the picture to a certain extent. In order to equalize the pictures and to have all of them of the same degree of clearness and size as is desired, I provide interference for the first cameras equal to the interference of the reflecting transparencies for the last cameras, in order that the interference will be equalized for all of the cameras.

Figure 1:
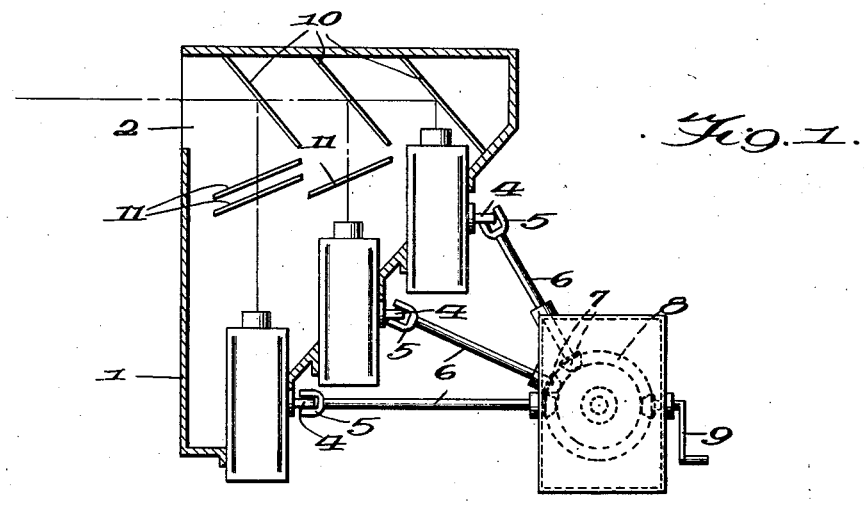
Figure 2:
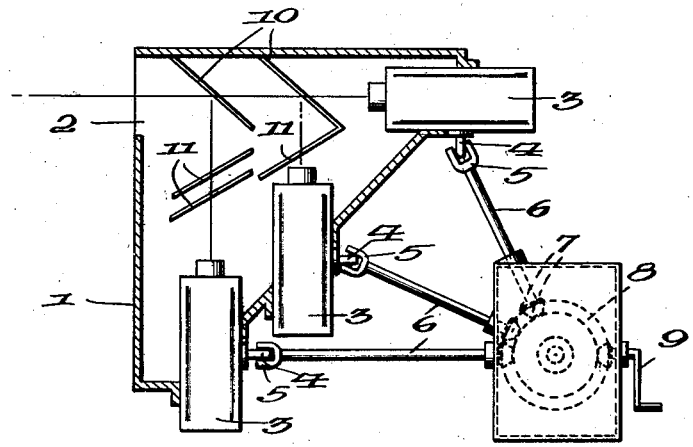

In the accompanying drawing,

Fig. 1 is a plan view with the casing in section showing one form of this invention; and Fig. 2 is a similar view showing a slightly different arrangement.

I provide a box or casing 1 for enclosing the cameras and which is closed on all sides except for an opening 2 which is in line with the object and through which light passes from the object to the cameras. Ordinary motion picture cameras are designated 3, and I have shown three of such cameras in each view of the drawing, although the invention is applicable to any desired number of cameras. These cameras 3 are of the ordinary type normally designed for taking motion pictures, and each of them is provided with the usual operating shaft 4 for controlling the exposure thereof and the adjustment of the film in the ordinary way. The operating shafts 4 are connected by universal joints 5 with shafts 6 which are constructed for simultaneous operation, such for instance, as is provided by gearing all of these shafts together through pinions 7 to a gear 8, rotated by a handle 9, which is geared thereto for operation by an operator. Any other suitable means desired may be employed for simultaneous operation of the motion picture cameras.

As shown in Fig. 1, I provide a reflecting transparency 10 in front of each of the cameras 3 and set at an angle of approximately 45 degrees to the direction of light passing from the object so that each of these transparencies, except possibly the last, which may if desired, be only a mirror unless a camera is placed behind it as in Figure 2, not only permits light to pass therethrough to the next following cameras, but also reflects light from the front surface thereof to the camera arranged in alignment therewith.

This invention is applicable for taking a plurality of pictures simultaneously of an object from the same point of view, which is difficult to take with a single camera for the reason that if the camera or the lens is moved very slightly for the next picture, the perspective or point of view is changed, and the negatives will not be the same size over the entire area. The cameras being constructed for simultaneous exposure and operation receive light from the same point of the object through or from the reflecting transparencies 10.

The first transparency reflects light to the first camera as shown, the second transparency reflects light to the second camera as shown, but each of these permits light to pass therethrough to the second and third cameras, and the third or last camera may be set so as to receive either reflected light, as shown in Fig. 1, or transmitted light as in Fig. 2.

Since each of the transparent reflectors through which the light passes will change the size and shape of the image to a slight extent, the final negatives will be slightly different in size and shape by reason of such interference and in order to have all negatives exactly the same, I have arranged and used compensators to make this distortion uniform in all negatives. I employ transparent compensators 11 between the reflecting transparencies 10 and the cameras, so as to equalize the interference with the light passing to all of the cameras. For instance, in the arrangement shown, I employ three cameras, so that light passing to the first is reflected by the first transparency 10, and normally would not pass through any transparency. Light passing to the second camera would normally pass through the first transparency and be reflected to the second with interference by the first transparency and light passing to the third camera would pass through the first two transparencies with double the interference of the second.

The compensators 11 are placed between the first and second transparencies and their respective cameras, and since light for the last camera has two interferences in the first two transparencies 10, I employ two compensators 11, arranged in front of the first camera and one compensator 11 arranged in front of the second camera, so that light passing to each of the three cameras will pass through two transparencies or compensators, or both, and in that way, light passing to all three cameras will receive the same degree of interference.

It will be noted that the compensators 11 are placed at approximately the same angle to the direction of light reflected to the respective cameras as the angle of the transparencies 10 to the direction of light passing from the object, so as to be equal in interference to the transparencies.

If desired, in the making of colored moving pictures, I may coat the back of the first reflecting transparency 10 with one color, such for instance, as yellow, the back of the second transparency 10 with another color, such as red.

The images reflected from the first reflector go to the first camera, and the yellow image is prevented from acting on the negative film not sensitive to yellow, or one of the compensators 11 may be coated violet or a violet filter placed in front or behind the lens of the first camera to hold back the yellow image. The red coating on the second transparency is on the side toward the third transparency, and the red image is stopped by the use of a film not sensitive to red, or the use of a green filter. These transparencies may be placed in different positions or colored differently if different effects are desired, but in the above-mentioned arrangement, there is obtained a minus yellow negative film in the first camera, a minus red negative film in the second camera, and a minus blue negative film in the third camera.

The yellow and red coatings on the first and second transparencies act as a filter for the third camera and hold back the blue image.

This invention may be used either with or without the above referred to color effects, but in any event, pictures are obtained in all of the cameras of equal size and from the same point of view of the object by the simultaneous operation of all of the moving picture cameras.

If desired, the invention may be used for projection besides taking pictures.

The area between the lenses and the object may be enclosed so as to shut out all light except that coming from the object. It is not necessary to enclose any of the other parts.

Instead of using three separate cameras, a compound camera may be used so as to eliminate some of the space and working parts, such a compound camera would contain three lenses, closer together, and three films or one film of triple width, one-third of which is exposed by each camera section.

I claim:

1. In photographic apparatus, the combination with a plurality of cameras having separate lenses arranged approximately at equal light distances from an object, of a transparent reflector plate arranged in front of one of said cameras in the direct path of light but at an angle to said path of light from the object in position to reflect light from the object directly to said camera and to transmit light to a second camera, said first-mentioned camera being so arranged that the direct path of light to its lens from the transparent reflector plate is approximately at right-angles to the path of light from the object to said transparent reflector plate, and a compensator plate equal in light interference to the reflector plate and arranged between the reflector plate and the first-mentioned camera in the path of the light passing to said camera and approximately at the same angle thereto as the transparent reflector plate to the light passing therethrough in position to compensate for any distortion caused by the image passing through the transparent reflector plate and equalizing any distortion between the object and the second camera.

2. In photographic apparatus, the combination of a plurality of cameras having separate lenses arranged approximately at equal light distances from an object, a transparent reflector plate arranged in front of one of said cameras in the direct path of light from the object but at an angle to said path of light in position to reflect light from the object directly to the camera and to transmits light to a second camera, a second transparent reflector plate arranged behind the first-mentioned transparent reflector plate at an angle to the path of light therefrom in position to reflect light directly to a second camera, and to transmit light to a third camera, said first and second-mentioned cameras being so arranged that the direct paths of light to their lenses are approximately at right-angles to the path of light from the object to the transparent reflector plates, one or more compensator plates equal in light interference to the first and second-mentioned transparent reflector plates and arranged between the first-mentioned transparent reflector plate and the first-mentioned camera in the path of light passing thereto, a compensator plate equal in light interference to the second-mentioned transparent reflector plate and arranged between the second-mentioned transparent reflector plate and the second camera, said compensator plate being arranged approximately at the same angle to the light passing therethrough as the transparent reflector plates to the light passing therethrough in position to compensate for any distortion caused by the image passing through the transparent reflector plates and equalizing any distortion between the object and the cameras.

3. In photographic apparatus, the combination of at least three cameras arranged side by side in parallel relation and having separate lenses arranged approximately at equal light distances from an object, a transparent reflector plate arranged in front of one of said cameras in the direct path of light from the object but at an angle to said path of light in position to reflect light from the object directly to the camera, and to transmit light to a second camera, a second transparent reflector plate arranged behind the first-mentioned transparent reflector plate at an angle to the path of light therefrom in position to reflect light directly to a second camera and to transmit light to a third camera, a third reflector in position to reflect light to the third camera, said cameras being so arranged that the direct paths of light to their lenses are approximately at right-angles to the path of light from the object to the transparent reflector plates, two compensator plates equal in light interference to the first and second-mentioned transparent reflector plates and arranged between the first-mentioned transparent reflector plate and the first-mentioned camera in the path of light passing thereto, a compensator plate equal in light interference to the second-mentioned transparent reflector plate and arranged between the second-mentioned transparent reflector plate and the second camera, said compensator plates being arranged approximately at the same angle to the light passing therethrough as the transparent reflector plates to the light from the object in position to compensate for any distortion caused by the image passing through the transparent reflector plates and equalizing any distortion between the object and the cameras.

4. In motion picture photographic apparatus, the combination of a plurality of motion picture cameras having separate lenses arranged approximately at equal light distances from an object, means for operating said cameras simultaneously, a transparent reflector plate arranged in front of one of said cameras in the direct path of light from the object but at an angle to said path of light in position to reflect light from the object directly to the camera and to transmit light to a second camera, a second transparent reflector plate arranged behind the first-mentioned transparent reflector plate at an angle to the path of light therefrom in position to reflect light directly to a second camera, and to transmit light to a third camera, said first and second-mentioned cameras being so arranged that the direct paths of light to their lenses are approximately at right-angles to the path of light from the object to the transparent reflector plates, one or more compensator plates equal in light interference to the first and second-mentioned transparent reflector plates and arranged between the first-mentioned transparent reflector plate and the first-mentioned camera in the path of light passing thereto, a compensator plate equal in light interference to the second-mentioned transparent reflector plate and arranged between the second-mentioned transparent reflector plate and the second camera, said compensator plate being arranged approximately at the same angle to the light passing therethrough as the transparent reflector plates to the light passing therethrough in position to compensate for any distortion caused by the image passing through the transparent reflector plates and equalizing any distortion between the object and the cameras.

5. In photographic apparatus, the combination with a plurality of cameras having separate lenses arranged approximately at equal light distances from an object, of a transparent reflector plate arranged in front of one of said cameras in the direct path of light but at an angle to said path of light from the object in position to reflect light from the object directly to said camera and to transmit light to a second camera, said first-mentioned camera being so arranged that the direct path of light to its lens from the transparent reflector plate is approximately at right-angles to the path of light from the object to said transparent reflector plate, and a compensator plate constructed and arranged so as to be equal in light interference to the reflector plate and between the reflector plate and the image of the first-mentioned camera in the path of the light passing to said camera in position to compensate for any distortion caused by the image passing through the transparent reflector plate and equalizing any distortion between the object and the second camera.

6. In photographic apparatus, the combination with photographic means having a plurality of separate lenses arranged approximately at equal light distances from an object, of a transparent reflector plate arranged in front of one of said lenses in the direct path of light but at an angle to said path of light from the object in position to reflect light from the object to said lens and to transmit light to a second lens, a second transparent reflector plate arranged behind the first-mentioned transparent reflector plate at an angle to the path of light therefrom in position to reflect light directly to the second lens and to transmit light to a third lens, a third reflector plate arranged behind the first and second-mentioned transparent reflector plates at an angle to the path of light therefrom in position to reflect light directly to the third lens, said first, second and third-mentioned lenses being so arranged that the direct path of light thereto from the reflector plates is approximately at right angles to the path of light from the object to said reflector plates, and compensator plates so constructed and arranged as to equalize or correct distortion caused by the reflector plates and located between the reflector plates and the images formed by the lenses in the path of light passing to said images.

FERNAND A. BOURGES.